(12) United States Patent
Holl et al.

(10) Patent No.: US 8,372,370 B2
(45) Date of Patent: Feb. 12, 2013

(54) CATALYTIC HYDROGENATION

(75) Inventors: Sven Holl, Gueckingen (DE); Sayed-Javad Mohsseni-Ala, Bitterfeld-Wolfen (DE); Christian Bauch, Am Alten Schulhof 3 (DE)

(73) Assignee: Spawnt Private S.A.R.L., Luxembourg (LU)

( * ) Notice: Subject to any disclaimer, the term of this patent is extended or adjusted under 35 U.S.C. 154(b) by 473 days.

(21) Appl. No.: 12/681,691

(22) PCT Filed: Mar. 28, 2008

(86) PCT No.: PCT/EP2008/002452
§ 371 (c)(1),
(2), (4) Date: Aug. 26, 2010

(87) PCT Pub. No.: WO2008/119505
PCT Pub. Date: Oct. 9, 2008

(65) Prior Publication Data
US 2011/0158883 A1    Jun. 30, 2011

(30) Foreign Application Priority Data
Mar. 30, 2007    (DE) .................. 10 2007 015 750

(51) Int. Cl.
*C01B 33/04* (2006.01)
*C01G 17/00* (2006.01)

(52) U.S. Cl. ........ 423/341; 423/342; 423/494; 423/645; 423/472

(58) Field of Classification Search .............. 423/341, 423/342, 494, 645, 472
See application file for complete search history.

(56) References Cited

U.S. PATENT DOCUMENTS

| | | | |
|---|---|---|---|
| 7,442,666 B2 * | 10/2008 | Herrwerth et al. | 502/100 |
| 7,534,920 B2 * | 5/2009 | Imamoto et al. | 568/10 |
| 2010/0074824 A1 * | 3/2010 | Otsu et al. | 423/347 |
| 2011/0268641 A1 * | 11/2011 | Brinson et al. | 423/342 |

\* cited by examiner

*Primary Examiner* — Ngoc-Yen Nguyen
(74) *Attorney, Agent, or Firm* — Harness, Dickey & Pierce, PLC

(57) ABSTRACT

A process for hydrogenating halogenated silanes or halogenated germanes. The process comprises hydrogenating a Lewis acid-base pair with addition of $H_2$, hydrogenating halogenated silanes or halogenated germanes with an $H^-$-containing Lewis acid-base pair, and regenerating the Lewis acid-base pair and releasing hydrogen halide.

12 Claims, 2 Drawing Sheets

CATALYTIC HYDROGENATION

Figure 1:
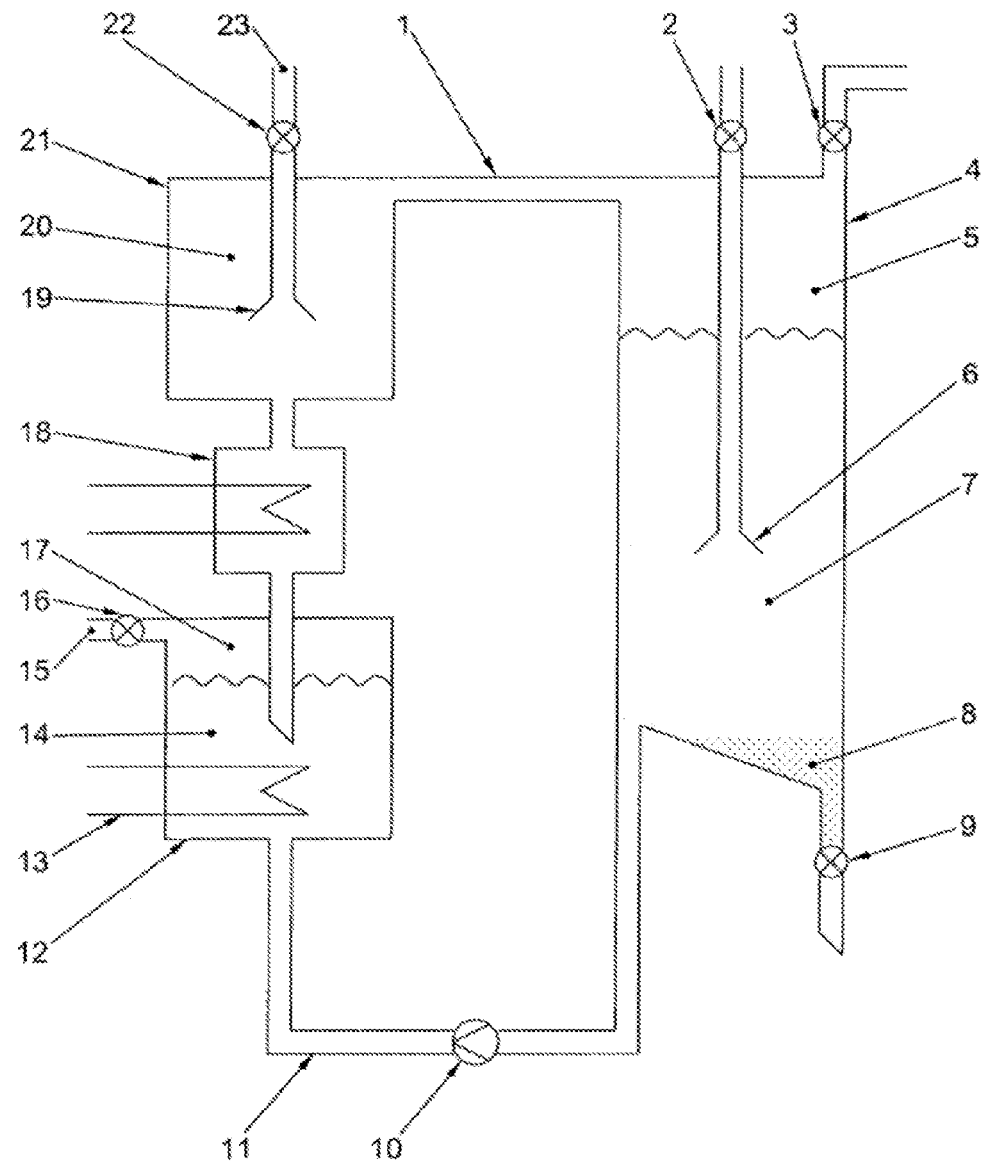

The prior art discloses various processes for hydrogenating silanes and germanes. Halosilanes can be hydrogenated with metal hydrides, such as with titanium hydride according to, for example, SU 1766925 A1 or JP 50017035, with sodium hydride according to, for example, JP 2003313190 A2, with lithium hydride according to, for example, JP 1234316 or EP 102293 A2, with lithium aluminum hydride according to, for example, RU 2266293 C1 or U.S. Pat. No. 5,965,762 A or with sodium borohydride according to, for example, JP 2003119200 A2. The metal hydride may have organic substitution, as described, for example, in JP 61063515 A2 for diethylaluminum hydride. Halogenated oligosilanes can be partially hydrogenated by Si—Si bond cleavage with hydrogen halide in the presence of different catalysts, as disclosed, for example, in EP 737687 A1 or EP 574912 A1. $SiCl_4$ can be catalytically reacted with hydrogen to give $HSiCl_3$, for example according to U.S. Pat. No. 5,716,590. Even in the presence of a halide acceptor such as aluminum, magnesium or zinc metal, it is possible to react halosilanes with hydrogen, as described, for example, in U.S. Pat. No. 2,406,605, U.S. Pat. No. 5,329,038 A or DE 4119578 A1. $SiH_4$ can be obtained, for example according to JP 11156199 AA or JP 59121110 AA, by substituent exchange from $HSiCl_3$, which simultaneously forms $SiCl_4$.

Disadvantages of the known processes are, firstly, low yields and a large amount of by-products, and secondly the necessity of an electrochemical step for regeneration of the hydrogenating agent.

The prior art discloses, according to 1) G. C. Welch, R. R. S. Juan, J. D. Masuda, D. W. Stephan, "Reversible, metal-free hydrogen activation", Science 2006, 314, 1124 and 2) G. C. Welch, D. W. Stephan, "Facile heterolytic cleavage of dihydrogen by phosphines and boranes", J. Am. Chem. Soc. 2007, 129, 1880, that a combination of suitable phosphines $PR_3$ and boranes $BR'_3$ splits hydrogen heterolytically.

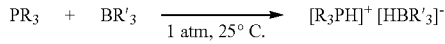

$$PR_3 + BR'_3 \xrightarrow{1 \text{ atm}, 25° C.} [R_3PH]^+ [HBR'_3]^-$$

It is an object of the invention to provide a process for hydrogenating silicon halides or germanium halides, with which a particularly good yield can be achieved with a low proportion of by-products.

SUMMARY

This object is achieved in accordance with the invention by a process according to claim 1.

Advantageous developments of the invention are described in the dependent claims.

In accordance with the invention, a process is described for catalytic hydrogenation of halogenated silanes or germanes, in which halogenated mono-, oligo- or polysilanes or -germanes are hydrogenated or partially hydrogenated with hydrogenated Lewis acid-base pairs, and the partially halogenated Lewis acid-base pairs are hydrogenated again with release of hydrogen halide and more particularly with subsequent addition of $H_2$ and heterolysis thereof on the Lewis acid-base pairs.

DRAWINGS

The drawings described herein are for illustrative purposes only of selected embodiments and not all possible implementations, and are not intended to limit the scope of the present disclosure.

Figure 2:
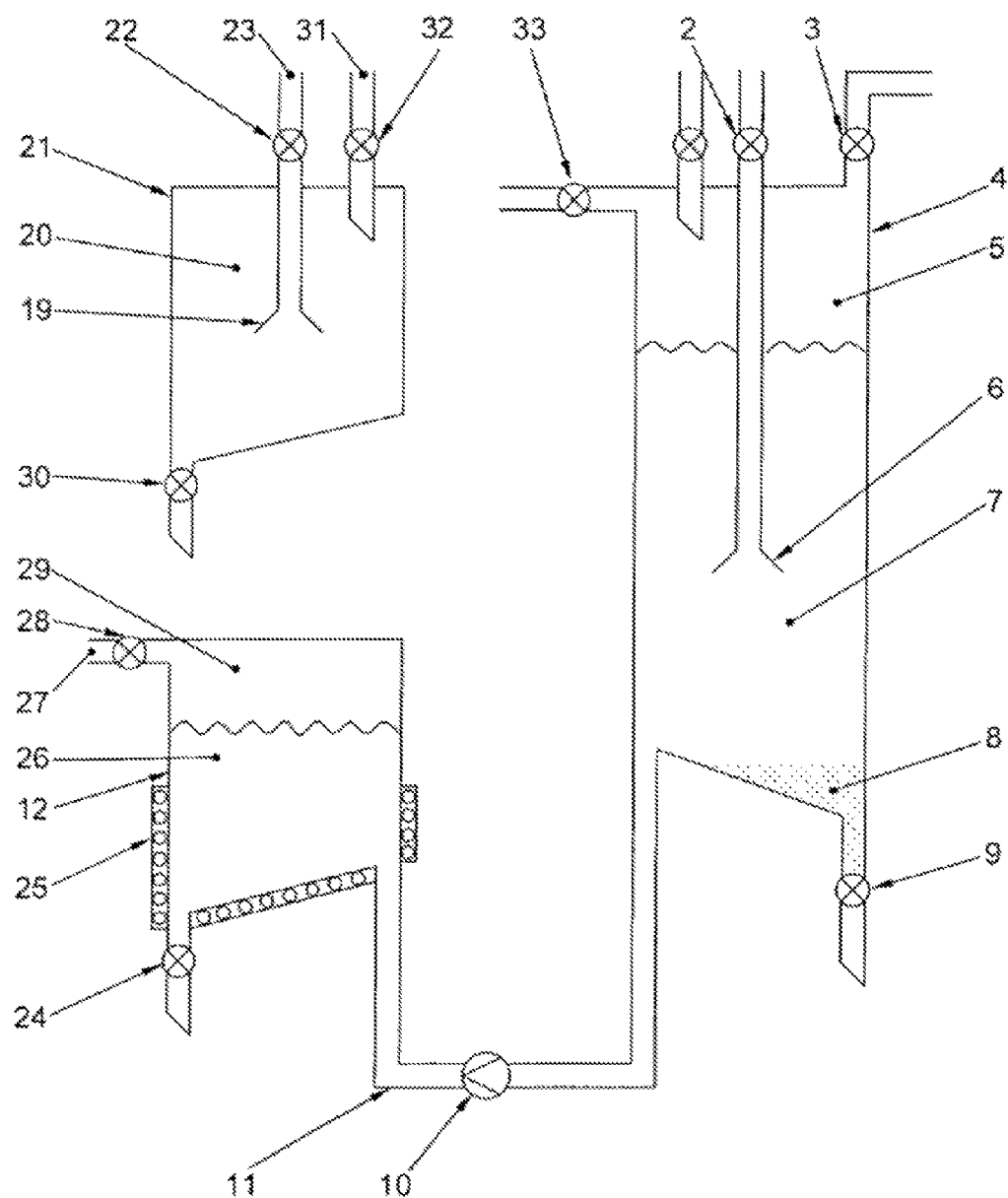

FIG. 1 is a diagram of a first embodiment comprising a single solvent or solvent mixture; and FIG. 2 is a diagram of a second embodiment comprising more than one solvent or solvent mixture.

The following list of reference numerals indicates corresponding parts throughout the several views of the drawings.

| | |
|---|---|
| 1. | Connection to the hydrogenation reactor 4 |
| 2. | Feed of halogenated silane or germane |
| 3. | Removal of gaseous hydrogenated silanes and partially hydrogenated halosilanes or halogermanes |
| 4. | Hydrogenation reactor |
| 5. | Gaseous hydrogenated silanes and partially hydrogenated halosilanes or corresponding germanes |
| 6. | Feed nozzle for halogenated silane or germane |
| 7. | Reaction mixture in the hydrogenation reactor |
| 8. | Precipitation of hydrogenated polysilanes or partially hydrogenated halogenated polysilanes or corresponding germanes |
| 9. | Removal stub |
| 10. | Circulation pump |
| 11. | Feed of spent Lewis acid-base pair to regeneration |
| 12. | Regeneration reactor for driving out HX |
| 13. | Heating coil |
| 14. | Liquid level in the regeneration reactor |
| 15. | Outlet stub for gaseous HX |
| 16. | Outlet valve |
| 17. | Gaseous HX |
| 18. | Condenser |
| 19. | Feed nozzle for $H_2$ |
| 20. | Reaction mixture for heterolysis of $H_2$ |
| 21. | Reactor for rehydrogenation of the Lewis acid-base pairs |
| 22. | Feed valve for $H_2$ |
| 23. | Feed of $H_2$ |
| 24. | Removal stub for degassed catalyst |
| 25. | Heating jacket |
| 26. | Fill level of regeneration reactor |
| 27. | Outlet stub for solvent vapor and gaseous HCl |
| 28. | Outlet valve |
| 29. | Gaseous solvent and/or HCl |
| 30. | Removal stub for hydrogenated catalyst |
| 31. | Feed for solvent and degassed catalyst |
| 32. | Feed of solvent |
| 33. | Feed for hydrogenated catalyst |

DETAILED DESCRIPTION

The Lewis base used is preferably an $R_3E$ where E=N, P or As and R=alkyl, aryl, O-alkyl, O-aryl or halogen, and the Lewis acid used is an $R'_3E'$ where E'=B, Al or Ga and where R'=alkyl, aryl, halogenated alkyl and aryl substituents or halogen.

The preferred elements of main group IV, silicon and germanium, have been halogenated with chlorine or fluorine.

In a first step, hydrogenating a Lewis acid-base pair is preferably performed at a temperature between −80° C. and 200° C. In addition, the Lewis acid-base pair is preferably hydrogenated at a pressure between 0.1 MPa and 10.0 MPa.

In a second step, hydrogenating a monomeric, oligomeric or polymeric halogenated silane or halogenated germane is preferably performed at a temperature between −20° C. and 200° C. In addition, a hydrogenation of the is preferably performed at a pressure between 0.05 MPa and 0.5 MPa.

In a development of the process according to the invention, the element-hydrogen compounds of main group IV, including silicon-H compounds and germanium-H compounds, which precipitate out in solid form in a hydrogenation reactor are removed by means of a removal device at the base of the reactor. The element-hydrogen compounds of main group IV, including silicon-H compounds and germanium-H compounds, which form as a gas in the hydrogenation reactor, are preferably obtained via a removal device.

In a third step, hydrogen halide, which forms in a reaction reactor, is preferably driven out thermally and withdrawn from the process via a valve. The hydrogen halide is preferably released at temperatures between 100° C. and 300° C.

In a specific embodiment of the process comprising three steps, the second step is performed in a first reactor, and the third step in a second reactor. In this case, preference is given to feeding a regenerated Lewis acid-base pair back to the first reactor.

Appropriately, the halogenated Lewis acid-base pair formed in the second step, is converted to a regenerated Lewis acid-base pair in the third step by releasing hydrogen halide, and then the regenerated Lewis acid-base pair is hydrogenated again by further addition of $H_2$ in the first step.

The basis of the process according to the invention is the implementation of a catalyst system for catalytic conversion of monomeric, oligomeric or polymeric halosilanes to the corresponding hydrogenated polysilanes $Si_nH_{n+2}$ and $[SiH_2]_n$ by means of $H_2$. The same applies to the use of germanes.

The situation is also similar for mixtures of different halogenated silanes or germanes.

This catalytic conversion can be illustrated as follows:

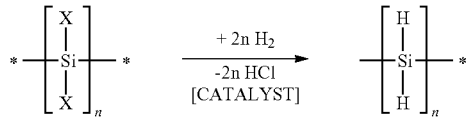

The novel process includes, as well as the hydrogenation of halogenated oligo- or polysilanes, also the corresponding conversion of tetrachlorosilane or halogenated monosilanes to $SiH_4$.

The novel process for catalytic hydrogenation also enables partial hydrogenations, for example of $SiCl_4$ to $HSiCl_3$, in which case these partially hydrogenated products may in principle be sent to a further use or may be recycled into the process for full hydrogenation.

It is known from the prior art that Lewis acid-base pairs which cannot form direct adducts owing to their sterically hindered structure can serve as catalysts for heterolytic splitting of $H_2$. Lewis acid and Lewis base may be present as separate compounds, but they may also be present within one molecular compound. In addition, the catalytically active compounds may be fixed to support bodies.

The Lewis bases used may be compounds of the elements E=N, P or As, and the Lewis acids compounds of the elements E'=B, Al and Ga.

The novel catalytic cycle passes through, for example, the following circuit for hydrogenation of halogenated silanes:

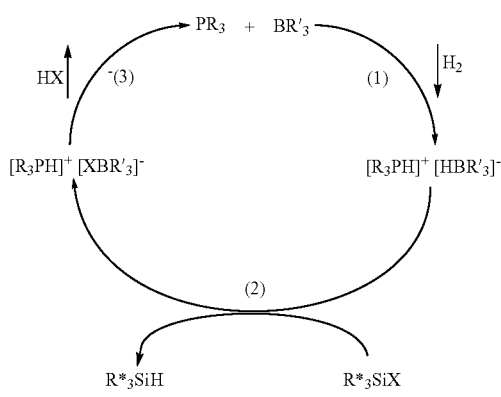

where R may be alkyl, aryl, O-alkyl, O-aryl or halogen, R' may be alkyl, aryl, halogenated alkyl and aryl substituents or halogens, R*=H, halogen, alkyl, aryl, silyl, O-alkyl or D-aryl, and X=F, Cl, Br, I.

The process according to the invention proceeds essentially in three steps:
the heterolysis of $H_2$ (step 1) by the catalyst proceeds preferably in the temperature range from −80° C. to 200° C. at pressures of 0.1 MPa-10.0 MPa,
the hydrogenation of the halogen compounds ($R^*_3SiX$) and the removal of the hydrogenated products proceeds in a step 2 preferably at −20° C. to 200° C. and a pressure of 0.05-0.5 MPa, and
in a third step the release of HX is performed thermally or optionally with the aid of sterically very demanding and/or non-nucleophilic bases. The thermal release is accomplished preferably at 100° C. to 300° C.

In a first embodiment, the process according to the invention is illustrated in FIG. 1. In this embodiment, hydrogenation of the catalyst, conversion of the halogenated silane or halogenated germane, and regeneration of the catalyst are performed in a single solvent or solvent mixture.

In a second embodiment, the process according to the invention is illustrated in FIG. 2. In this embodiment, the catalyst can be hydrogenated in a different solvent or solvent mixture than the conversion of the halogenated silane or halogenated germane, and the catalyst is isolated by distillation before the regeneration.

The invention claimed is:

1. A process for hydrogenating halogenated silanes or halogenated germanes, the process comprising:
   a. in a first step, hydrogenating a Lewis acid-base pair with addition of $H_2$ to form an $H^-$-containing Lewis acid-base pair,
   b. in a second step, hydrogenating monomeric, oligomeric or polymeric halogenated silanes or halogenated germanes with the $H^-$-containing Lewis acid-base pair to form a halogenated Lewis acid-base pair, and
   c. in a third step, releasing hydrogen halide from the halogenated Lewis acid-base pair to form regenerated Lewis acid-base pair.

2. The process for hydrogenating halogenated silanes or halogenated germanes as claimed in claim 1, wherein the Lewis base used is $R_3E$ where E=N, P or As and R=alkyl, aryl, O-alkyl, O-aryl or halogen, and the Lewis acid used is $R'_3E'$ where E'=B, Al or Ga and where R'=alkyl, aryl, halogenated alkyl and aryl substituents or halogen.

3. The process for hydrogenating halogenated silanes or halogenated germanes as claimed in claim 1, wherein the halogenated silanes or halogenated germanes comprise chlorine or fluorine.

4. The process for hydrogenating halogenated silanes or halogenated germanes as claimed in claim 1, wherein the hydrogenation of the Lewis acid-base pair is performed at a temperature between −80° C. and 200° C.

5. The process for hydrogenating halogenated silanes or halogenated germanes as claimed in claim 1, wherein the hydrogenation of the Lewis acid-base pair is performed at a pressure between 0.1 MPa and 10.0 MPa.

6. The process for hydrogenating halogenated silanes or halogenated germanes as claimed in claim 1, wherein the hydrogenation of the halogenated silanes or halogenated germanes is performed at a temperature between −20° C. and 200° C.

7. The process for hydrogenating halogenated silanes or halogenated germanes as claimed in claim 1, wherein the hydrogenation of the halogenated silanes or halogenated germanes is performed at a pressure between 0.05 MPa and 0.5 MPa.

8. The process for hydrogenating halogenated silanes or halogenated germanes as claimed in claim 1, wherein, in the second step, silicon-H compounds or germanium-H compounds precipitate out in solid form.

9. The process for hydrogenating halogenated silanes or halogenated germanes as claimed in claim 1, wherein, in the second step, silicon-H compounds or germanium-H compounds form as a gas.

10. The process for hydrogenating halogenated silanes or halogenated germanes as claimed in claim 1, wherein the hydrogen halide is thermally released.

11. The process for hydrogenating halogenated silanes or halogenated germanes as claimed in claim 1, wherein the hydrogen halide is released thermally at temperatures between 100° C. and 300° C.

12. The process for hydrogenating halogenated silanes or halogenated germanes as claimed in claim 1, wherein the regenerated Lewis acid-base pair is hydrogenated again in the first step with further addition of $H_2$.

* * * * *